US010534381B2

(12) United States Patent
Wu et al.

(10) Patent No.: US 10,534,381 B2
(45) Date of Patent: Jan. 14, 2020

(54) SELF-CONTAINED PRESSURE COMPENSATION SYSTEM

(71) Applicant: Xuzhou Construction Machinery Group Co., Ltd., Xuzhou (CN)

(72) Inventors: Xingcong Wu, Xuzhou (CN); Yong Li, Xuzhou (CN); Wen Zheng, Xuzhou (CN)

(73) Assignee: Xuzhou Construciton Machinery Group Co., Ltd., Xuzhou, Jiangsu (CN)

( * ) Notice: Subject to any disclaimer, the term of this patent is extended or adjusted under 35 U.S.C. 154(b) by 237 days.

(21) Appl. No.: 15/604,581

(22) Filed: May 24, 2017

(65) Prior Publication Data

US 2017/0255210 A1 Sep. 7, 2017

Related U.S. Application Data

(63) Continuation of application No. PCT/CN2015/073101, filed on Feb. 15, 2015.

(30) Foreign Application Priority Data

Nov. 24, 2014 (CN) .......................... 2014 1 0680200

(51) Int. Cl.
*G05D 16/20* (2006.01)
*F15B 1/033* (2006.01)

(52) U.S. Cl.
CPC ......... *G05D 16/2066* (2013.01); *F15B 1/033* (2013.01)

(58) Field of Classification Search
CPC ........ F15B 1/027; F15B 1/0275; F15B 1/033; F15B 1/10; F15B 21/005; F15B 2211/625; Y10T 137/3127; G05D 16/2066

(Continued)

(56) References Cited

U.S. PATENT DOCUMENTS 2,714,854 A 8/1955 Tyler
4,278,403 A * 7/1981 Shafer .................... F15B 1/033 417/38

(Continued)

FOREIGN PATENT DOCUMENTS

CN 2654920 Y 11/2004
CN 201106588 Y 6/2008

(Continued)

OTHER PUBLICATIONS

English translation of International Search Report and Written Opinion dated Sep. 6, 2015 in PCT Application No. PCT/CN2015/073101. 9 pages.

(Continued)

*Primary Examiner* — Kevin F Murphy
(74) *Attorney, Agent, or Firm* — Kilpatrick Townsend & Stockton LLP

(57) ABSTRACT

A self-contained pressure compensation system and a control method thereof are provided, wherein the self-contained pressure compensation system comprises an oil supply device, a pressure compensation device, a power unit associated with the pressure compensation device, and a switch control device, the pressure compensation device supplies oil to the power unit and detects a change in a chamber pressure of itself in real time, the switch control device triggers the oil supply device to supply oil to the pressure compensation device if the chamber pressure is less than a predetermined first threshold and triggers the oil supply device to stop supplying oil to the pressure compensation device if the chamber pressure is greater than a predetermined second threshold. The invention can detect a chamber pressure of the pressure compensation device in real-time and can achieve automatic oil refilling, and can provide pressure compensation for the power unit effectively.

10 Claims, 6 Drawing Sheets

(58) Field of Classification Search
USPC ........................................................... 91/446
See application file for complete search history.

(56) References Cited

U.S. PATENT DOCUMENTS 4,612,766 A 9/1986 Eder
4,730,092 A * 3/1988 Eggert .................... F15B 1/033 200/82 B
5,197,787 A * 3/1993 Matsuda ............... B60T 8/4045 188/181 R
5,944,159 A * 8/1999 Schneider ............... F15B 1/033 192/85.56
6,070,408 A * 6/2000 Clarke .................... F15B 1/033 60/415
6,159,061 A * 12/2000 Gorokawa ............. B63H 20/10 440/53
6,669,208 B1 12/2003 Monk et al.
7,269,944 B2 * 9/2007 Zhang ................... E02F 9/2217 60/414
8,596,051 B2 * 12/2013 Malaney ............... F15B 21/008 60/327
2002/0067398 A1 6/2002 Shyn et al.
2003/0188529 A1 * 10/2003 Collet ...................... B62D 5/30 60/405
2009/0126360 A1 * 5/2009 Bordwell ................ F15B 1/024 60/413

FOREIGN PATENT DOCUMENTS

CN 101408208 A 4/2009
CN 101832303 A 9/2010
CN 101994724 A 3/2011
CN 204344579 U 5/2015
WO 2016023712 A1 2/2016

OTHER PUBLICATIONS

Extended European Search Report dated Jun. 22, 2018 in EP Patent Application No. 15864286.8. 14 pages.

* cited by examiner

SELF-CONTAINED PRESSURE COMPENSATION SYSTEM

CROSS-REFERENCE TO RELATED APPLICATIONS

This application is a continuation application of PCT application PCT/CN2015/073101 entitled "AUTOMATIC SUPPLYING PRESSURE COMPENSATION SYSTEM AND CONTROL METHOD THEREOF," filed on Feb. 15, 2015, which claims priority to Chinese Patent Application No. 201410680200.6, filed on Nov. 24, 2014, which are herein incorporated by reference in their entirety for all purposes.

TECHNICAL FIELD

The present invention relates to the field of pressure compensation, and more particularly to a self-contained pressure compensation system and a control method thereof.

BACKGROUND

With the increasing number of equipment for underwater or even deep sea exploration and construction, pressure compensation devices are increasingly used for balancing the internal pressure of a power unit in a construction equipment, so as to reduce the requirements on sealing of the power unit. For the power unit with more powerful impact, in order to achieve the sealing effect better, it is best to ensure that the internal pressure of the power unit is slightly higher than the external pressure.

Most of the current pressurized pressure compensation devices are used independently in the construction equipment, but due to an oil leakage of the construction equipment is inevitable, the pre-pressure of the pressurized pressure compensation device becomes smaller gradually, therefore it is often needed to lift the pressure compensation devices out of the water surface for oil refilling manually. The existing pressurized pressure compensation device cannot make a real-time detection of its internal pressurization value, and can only observe the piston position of the pressure compensation device manually to determine whether or not there is a need of oil refilling. This process not only reduces the construction efficiency, and more seriously, water seepage may occur inside the power unit due to a failure of timely oil refilling.

BRIEF SUMMARY

An object of the present invention is to provide a self-contained pressure compensation system and a control method thereof, which can detect a chamber pressure of the pressure compensation device in real-time, can achieve oil refilling automatically, and can provide pressure compensation for the power unit effectively.

According to an aspect of the present invention, a self-contained pressure compensation system is provided, comprising:

- an oil supply device;
- a pressure compensation device and a power unit associated with the pressure compensation device, the pressure compensation device supplying oil to the power unit and detecting a change in a chamber pressure of the pressure compensation device itself in real time; and
- a switch control device for triggering the oil supply device to supply oil to the pressure compensation device if a chamber pressure detected by the pressure compensation device is less than a predetermined first threshold, and triggering the oil supply device to stop supplying oil to the pressure compensation device if the chamber pressure is greater than a predetermined second threshold.

In an embodiment, the switch control device switches off an oil passage between the pressure compensation device and the power unit when the oil supply device supplies oil to the pressure compensation device, and switches on the oil passage between the pressure compensation device and the power unit when the oil supply device stops supplying oil to the pressure compensation device.

In an embodiment, a spare bladder connected in the oil passage between the pressure compensation device and the power unit, for providing pressure compensation for the power unit when the oil passage between the pressure compensation device and the power unit is switched off.

In an embodiment, the pressure compensation device comprises:

- a displacement sensor fixed to an upper end of the pressure compensation device, for detecting a position of the piston relative to the upper end of the pressure compensation device, and for indicating to the switch control device that the chamber pressure is less than the predetermined first threshold if the position detected is less than a first predetermined value, and that the chamber pressure is greater than the predetermined second threshold if the position detected is greater than a second predetermined value; and
- a piston capable of moving up and down in a chamber of the pressure compensation device.

In an embodiment, the oil supply device comprises an oil storage tank, the oil storage tank being provided with an oil storage bladder, the bladder being connected to a first main oil passage;

- the switch control device switches on the first main oil passage when triggering the oil supply device to supply oil to the pressure compensation device, so as to supply oil to the oil storage bladder through the first main oil passage, causing a volume increase of the oil storage bladder and thus causing the oil in the oil storage tank to be squeezed by the oil storage bladder and enter the pressure compensation device through the oil passage between the oil storage tank and the pressure compensation device, so that the piston in the pressure compensation device moves downwards; and
- the switch control device switches off the first main oil passage when triggering the oil supply device to stop supplying oil to the pressure compensation device, so as to stop supplying the oil to the oil storage bladder.

In an embodiment, a first change valve provided on the first main oil passage, for controlling an on-off state of the first main oil passage; and

- a second change valve provided on the oil passage between the pressure compensation device and the associated power unit, for controlling an on-off state of the oil passage between the pressure compensation device and the associated power unit.

In an embodiment, a check valve provided on the oil passage between the oil storage tank and the pressure compensation device, for preventing the oil in the pressure compensation device from flowing back to the oil storage tank.

In an embodiment, the oil storage bladder is also connected with a second main oil passage, and the oil storage tank and the pressure compensation device are connected with a third main oil passage respectively;

in the system oil refilling stage, the second main oil passage and the third main oil passage are switched on, so that oil is supplied to the oil storage tank and the pressure compensation device through the third main oil passage, squeezing the oil storage bladder and thus discharging the oil in the oil storage bladder through the second main oil passage;

the second main oil passage and the third main oil passage are switched off after the oil storage bladder is evacuated and the pressure compensation device and its associated power unit and the spare bladder are filled with oil.

In an embodiment, the oil storage tank is provided with a vent hole that can be closed, so as to discharge air in the oil storage tank in the system oil refilling stage;

the pressure compensation device is provided with a vent hole that can be closed, so as to discharge air in the pressure compensation device in the system oil refilling stage.

In an embodiment, the vent hole that can be closed on the oil storage tank is provided above the oil storage tank, and the vent hole that can be closed on the pressure compensation device is provided above the pressure compensation device.

In an embodiment, the number of the pressure compensation device is N, N≥1;

the switch control device switches on an oil passage between the oil storage tank and the i-th pressure compensation device when the i-th pressure compensation device in the system detects that the chamber pressure is less than the predetermined first threshold, and switches off an oil passage between the oil storage tank and the i-th pressure compensation device when the i-th pressure compensation device detects that the chamber pressure is greater than the predetermined second threshold, where 1≤i≤N.

In an embodiment, a compensation change valve provided on the oil passage between the oil storage tank and each pressure compensation device respectively, for controlling the on/off state of the respective oil passages.

According to another aspect of the present invention, a self-contained pressure compensation control method is provided, comprising steps of:

receiving a detection result transmitted by a pressure compensation device, wherein the pressure compensation device detecting a change in a chamber pressure of itself in real time and supplying oil to a power unit;

triggering an oil supply device to supply oil to the pressure compensation device if the chamber pressure is less than a predetermined first threshold; and triggering the oil supply device to stop supplying oil to the pressure compensation device if the chamber pressure is greater than a predetermined second threshold.

In an embodiment, further comprising:

switching off an oil passage between the pressure compensation device and the power unit when triggering the oil supply device to supply oil to the pressure compensation device;

switching on the oil passage between the pressure compensation device and the power unit when triggering the oil supply device to stop supplying oil to the pressure compensation device.

In an embodiment, further comprising:

the spare bladder provides pressure compensation for the power unit when the oil passage between the pressure compensation device and the power unit is switched off.

In an embodiment, the step of the pressure compensation device detecting a change in a chamber pressure of itself in real time comprises:

a displacement sensor in the pressure compensation device detects a position of the piston in the pressure compensation device relative to an upper end of the pressure compensation device in real time;

the pressure compensation device determines whether or not the position is less than a first predetermined value;

if the position is less than a first predetermined value, then determines that the chamber pressure is less than the predetermined first threshold;

if the position is not less than the first predetermined value, then further determines whether or not the position of the piston is greater than a second predetermined value;

if the position is greater than the second predetermined value, then determines that the chamber pressure is greater than the predetermined second threshold.

In an embodiment, the step of triggering oil supply device to supply oil to the pressure compensation device comprises:

switching on the first main oil passage, so as to supply oil to the oil storage bladder through the first main oil passage, causing a volume increase of the oil storage bladder and thus causing the oil in the oil storage tank to be squeezed by the oil storage bladder and enter the pressure compensation device through the oil passage between the oil storage tank and the pressure compensation device, wherein the oil storage bladder is located in the oil storage tank of the oil supply device; and the step of triggering the oil supply device to stop supplying oil to the pressure compensation device comprises:

switching off the first main oil passage, so as to stop supplying the oil to the oil storage bladder.

In an embodiment, further comprising:

in the system oil refilling stage, switching on the second main oil passage and the third main oil passage, so as to supply oil to the oil storage tank and the pressure compensation device through the third main oil passage, thus causing the oil in the oil storage bladder to be squeezed by the oil storage bladder and discharged through the second main oil passage;

switching off the second main oil passage and the third main oil passage after the oil storage bladder is evacuated and the pressure compensation device and its associated power unit and the spare bladder are filled with oil.

In an embodiment, the number of the pressure compensation device is N, N≥1;

switching on an oil passage between the oil storage tank and the i-th pressure compensation when the i-th pressure compensation device detects that the chamber pressure is less than the predetermined first threshold; and switching off an oil passage between the oil storage tank and the i-th pressure compensation when the i-th pressure compensation device detects that the chamber pressure is greater than the predetermined second threshold, where 1≤i≤N.

The invention can provide pressure compensation for the power unit effectively by detecting the chamber pressure of the pressure compensation device in real time, so as to realize the automatic oil refilling.

BRIEF DESCRIPTION OF THE DRAWINGS

The drawings described herein are provided to provide a further understanding of the invention, which form a part of this application, and the illustrative embodiments of the invention and its description are intended to illustrate the invention and are not to be construed as limiting the invention. In the drawings.

DETAILED DESCRIPTION

Preferred embodiments of the present invention will now be described with reference to the drawings and embodiments.

Figure 1:
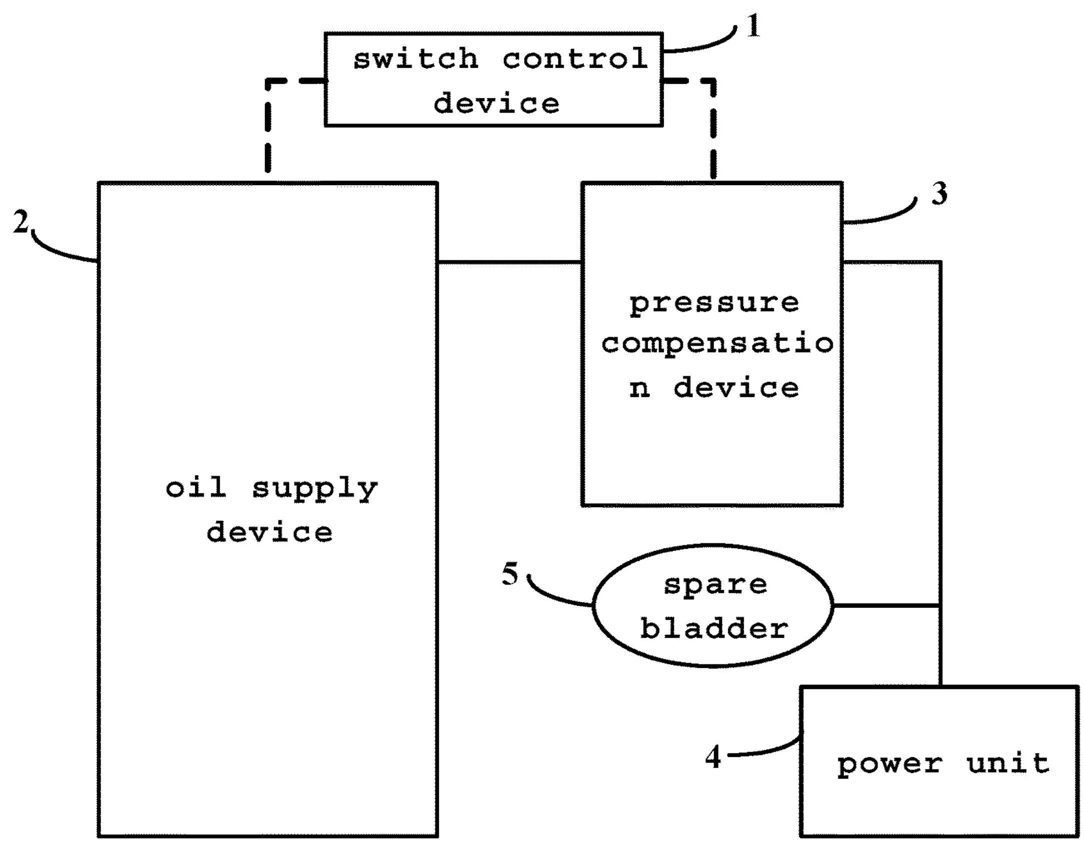
FIG. 1 is a schematic view of an embodiment of the self-contained pressure compensation system of the present invention.

FIG. 1 is a schematic view of an embodiment of the self-contained pressure compensation system of the present invention. As shown in FIG. 1, the system includes an oil supply device 2, a pressure compensation device 3, a power unit 4 associated with the pressure compensation device 3, and switch control device 1, wherein:

- the pressure compensation device 3 is for supplying oil to the power unit 4 and is also capable of detecting a change in the chamber pressure of itself in real time.
- the switch control device 1 is, according to the chamber pressure detected by the pressure compensation device 3, for triggering the oil supply device 2 to supply oil to the pressure compensation device 3 if the chamber pressure is less than a predetermined first threshold $V_1$, and triggering the oil supply device 2 to stop supplying oil to the pressure compensation device 3 if the chamber pressure is greater than a predetermined second threshold $V_2$.

The self-contained pressure compensation system of the invention can detect the chamber pressure of the pressure compensation device in real time and can realize the automatic oil supply, which can provide the pressure compensation for the power unit effectively and improve the working efficiency.

In an embodiment, as shown in FIG. 1, when the oil supply device 2 supplies oil to the pressure compensation device 3, the switch control device 1 switches off the oil passage between the pressure compensation device 3 and the power unit 4; when the oil supply device 2 stops supplying oil to the pressure compensation device 3, the switch control device 1 switches on the oil passage between the pressure compensation device 3 and the power unit 4, so as to provide pressure compensation for the power unit 4.

In one embodiment, as shown in FIG. 1, a spare bladder 5 is further connected in the oil passage between the pressure compensation device 3 and the power unit 4, for providing pressure compensation for the power unit 4 when the oil passage between the pressure compensation device 3 and the power unit 4 is switched off.

Figure 2:
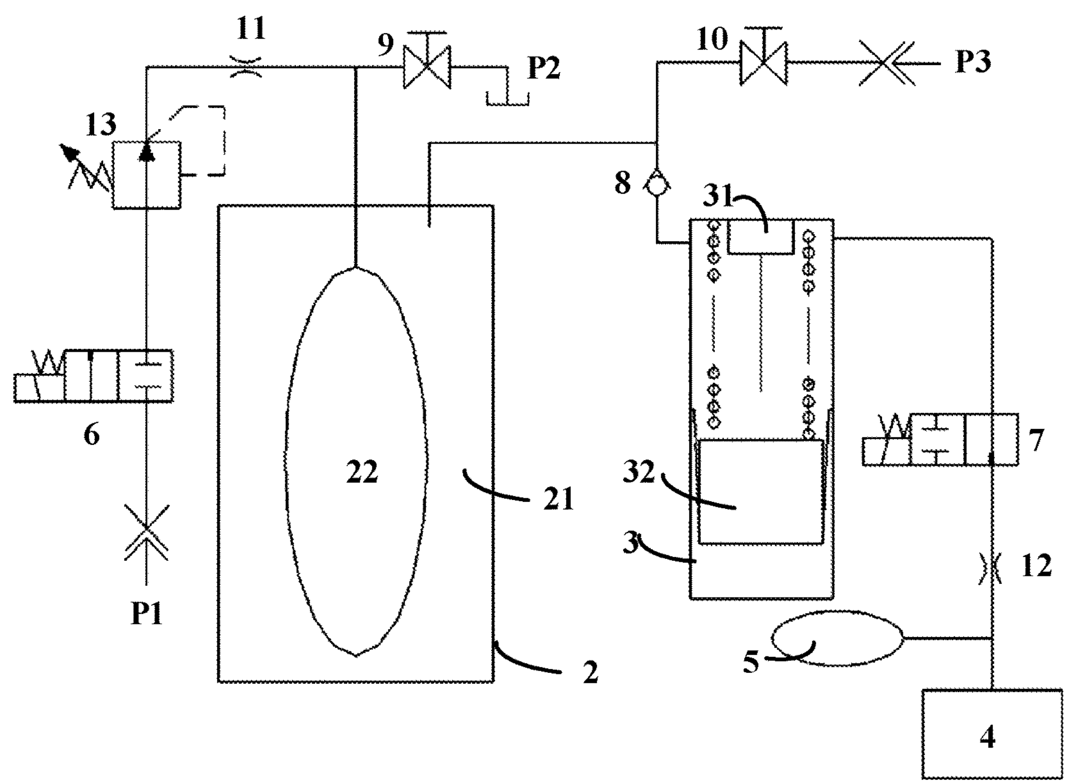
FIG. 2 is a schematic view of another embodiment of the self-contained pressure compensation system of the present invention.

The present invention will now be described by way of specific embodiments. FIG. 2 is a schematic view of another embodiment of the self-contained pressure compensation system of the present invention. As shown in FIG. 2, the pressure compensation device 3 in the system includes a displacement sensor 31 and a piston 32, the piston 32 is capable of moving up and down in a chamber of the pressure compensation device 3, the displacement sensor 31 is fixed to an upper end of the pressure compensation device 3, for detecting the position of the piston 32 relative to the upper end of the pressure compensation device 3. In one embodiment, the piston 32 and the upper end of the pressure compensation device 3 are connected by a spring, and the displacement sensor 31 detects the position S of the piston 32 relative to the upper end of the pressure compensation device 3 by detecting a tensile length of the spring. Specifically, under the action of the oil pressure, when the piston 32 moves downwardly in the chamber of the pressure compensation device 3, the spring will be stretched, and the displacement sensor 31 obtains the position S of the piston 32 relative to the upper end of the pressure compensation device 3 by detecting the amount of tension of the spring.

If the position S detected by the displacement sensor 31 is less than a first predetermined value $X_1$, the switch control device 1 (not shown in FIG. 2) is indicated that the chamber pressure is smaller than the predetermined first threshold $V_1$, then the switch control device 1 switches off the oil passage between the pressure compensation device 3 and the power unit 4, and at the same time triggers the oil supply device 2 to supply oil to the pressure compensation device 3, at this time the spare bladder 5 supplies oil to power unit 4.

If the position S detected by the displacement sensor 31 is greater than a second predetermined value $X_2$, the switch control device 1 is indicated that the chamber pressure is greater than the predetermined second threshold $V_2$, then the switch control device 1 triggers the oil supply device 2 to stop supplying oil to the pressure compensation device 3, and at the same time switches on the oil passage between the pressure compensation device 3 and power unit 4, so as to pressurizing the power unit 4.

In one embodiment, as shown in FIG. 2, the oil supply device 2 comprises an oil storage tank 21, the oil storage tank 21 is provided with an oil storage bladder 22, and the oil storage bladder 22 is connected to a first main oil passage P1.

The switch control device 1 switches on the first main oil passage P1 in response to a trigger of oil supply of the oil supply device 2 to the pressure compensation device 3, so as to supply oil to the oil storage bladder 22 through the first main oil passage P1. Since the oil storage tank 21 is filled with oil, the oil storage bladder 22 is increased in volume when the oil storage bladder 22 is filled with oil through the first main oil passage P1, and the oil in the oil storage tank 21 is squeezed and enters the pressure compensation device 3 through the oil passage between the oil storage tank 21 and pressure compensation device 3, so as to push the piston 32 downward to achieve the oil supply to the pressure compensating device 3. When the switch control device 1 triggers oil supply device 2 to stop supplying oil to the pressure compensating device 3, the first main oil passage P1 is switched off and the volume of the oil storage bladder 22 is no longer increased, and the oil in the oil storage tank 21 is no longer squeezed, thereby the oil supply to the pressure compensation device 3 is stopped.

In one embodiment, as shown in FIG. 2, a first change valve 6 is provided on the first main oil passage P1, for controlling an on-off state of the first main oil passage. A second change valve 7 is provided on the oil passage between the pressure compensation device 3 and the associated the power unit 4, for controlling an on-off state of the oil passage between the pressure compensation device 3 and the associated the power unit 4.

Preferably, the first change valve 6 and the second change valve 7 may be a two-position two-way valve. The first change valve 6 is a normally closed two-position two-way valve, and is switched on when the switch control device 1 triggers oil supply device 2 to supply oil to pressure compensation device 3. The second change valve 7 is a normally open two-position two-way valve, and is switched off when the switch control device 1 triggers to cut off the oil passage between the pressure compensation device 3 and the power unit 4.

Further, a check valve 8 is provided on the oil passage between the oil storage tank 21 and the pressure compensation device 3, for preventing the oil in the pressure compensation device 3 from flowing back to the oil storage tank 21.

In an embodiment, as shown in FIG. 2, the oil storage bladder 22 is also connected with the second main oil passage P2, and the oil storage tank 21 and the pressure compensation device 3 are connected with the third main oil passage P3 respectively.

Specifically, in the system oil refilling stage, the second main oil passage P2 and the third main oil passage P3 are switched on so as to supply oil to the oil storage tank 21 and the pressure compensation device 3 through the third main oil passage P3, and the oil in the oil storage bladder 22 is squeezed and discharged through the second main oil passage P2; after oil storage bladder 22 is evacuated and the pressure compensation device 3 and its associated power unit 4 and the spare bladder 5 are filled with oil, the second main oil passage P2 and the third main oil passage P3 are switched off.

Preferably, a first shut-off valve 9 is provided in the oil passage between the second main oil passage P2 and the oil storage bladder 22 so as to control the on-off of the second main oil passage P2, and a second shut-off valve 10 is provided in the oil passage between the third main oil passage P3 and oil passage between the oil storage tank 21 and the pressure compensation device 3 so as to control the on-off of the third main oil passage P3. The specific on-off operation can be done manually or automatically by setting a control unit.

Further, the oil storage tank 21 and pressure compensation device 3 are provided with a vent hole that can be closed (not shown in FIG. 2) to discharge air in the oil storage tank in the system oil refilling stage.

Preferably, the vent hole that can be closed on the oil storage tank oil storage tank 21 is provided above the oil storage tank 21, and the vent hole that can be closed on the pressure compensation device 3 is provided above the pressure compensation device 3.

Preferably, a pressure reducing valve 13 and a first throttle valve 11 are provided in the oil passage between the first change valve 6 and the oil storage bladder 22, so as to prevent an excessive impact to the oil passage and the oil storage bladder 22 caused by an excessive pressure when the first main oil passage P1 supplies oil to the oil storage bladder 22; a second throttle valve 12 is provided in the oil passage among the second change valve 7, the spare bladder 5 and the power unit 4 to prevent an excessive impact to the spare bladder 5 and the power unit 4 when the pressure compensation device 3 pressurizes the power unit 4.

Figure 3:
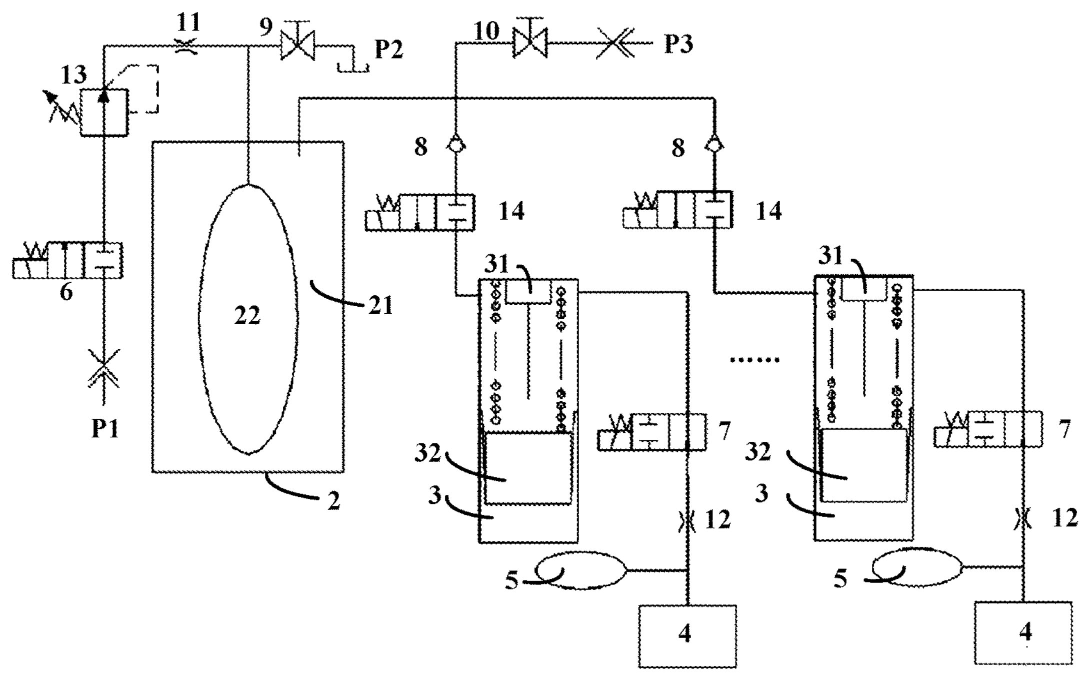
FIG. 3 is a schematic view of yet another embodiment of the self-contained pressure compensation system of the present invention.

In one embodiment, as shown in FIG. 3, the oil supply device 2 can supply oil to the N (N≥1) pressure compensation device 3. The pressure compensation device 3*i* (1≤i≤N) detects its respective chamber pressure, if the pressure compensation device 3*i* detects that the chamber pressure is less than the predetermined first threshold $V_{1i}$, the switch control device 1 (not shown in FIG. 3) switches on the oil passage between the oil storage tank 21 and the pressure compensation device 3*i*. Preferably, the oil is supplied to the power unit 4*i* through the spare bladder 5*i*. If the pressure compensation device 3*i* detects that the chamber pressure is greater than the predetermined second threshold $V_{2i}$, the switch control device 1 switches off the oil passage between the oil storage tank 21 and the pressure compensation device 3*i*, and at the same time switches on the oil passage among the pressure compensation device 3*i*, the power unit 4*i* and the spare bladder 5*i*.

Further, a compensation change valve 14*i* is provided on the oil passage between the oil storage tank 21 and the pressure compensation device 3*i* to control the on/off state of the respective oil passages, so that respective pressure compensation device 3*i* can perform the respective pressure compensation processes independently. Preferably, the compensation change valve 14*i* is a normally closed two-position two-way valve.

Further, the pressure compensation device 3 in the self-contained pressure compensation system shown in FIGS. 2 and 3 can count an amount of oil refilling based on the displacement of the piston 32 at each time of oil refilling, and the switch control device 1 can judge whether the oil quantity V in the oil storage tank 21 is sufficient based on the amount of oil refilling, and when the oil quantity V is smaller than a predetermined system oil refilling threshold $V_T$, oil refilling is made on the system, and the amount of oil refilling counted by the pressure compensation device 3 is reset. The oil refilling of the system can be carried out automatically or manually.

Figure 4:
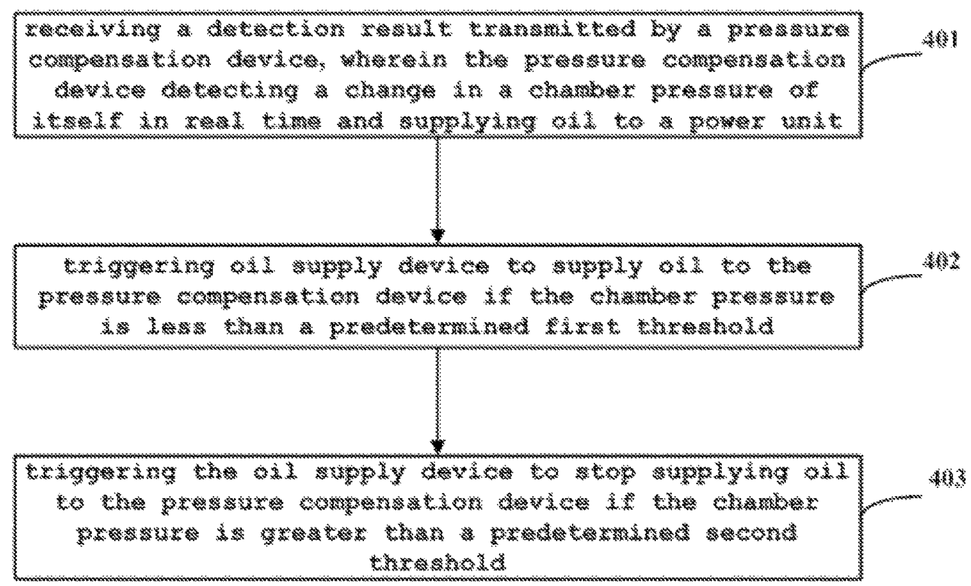
FIG. 4 is a schematic view of an embodiment of the self-contained pressure compensation control method of the present invention.

FIG. 4 is a schematic view of an embodiment of the self-contained pressure compensation control method of the present invention. Referring to FIGS. 2 and 4, the self-contained pressure compensation control method of the present embodiment comprises:

At step 401, pressure compensation device monitors the change in the chamber pressure of itself in real time, wherein the pressure compensation device 3 supplies oil to a power unit 4.

At step 402, oil supply device 2 is triggered to supply oil to the pressure compensation device 3 when the chamber pressure is less than the predetermined first threshold $V_1$.

Specifically, the oil passage between the pressure compensation device 3 and power unit 4 is switched off when the oil supply device 2 supplies the oil to the pressure compensation device 3.

Preferably, pressure compensation is provided to the power unit 4 by the spare bladder 5 when the oil passage between the pressure compensation device 3 and power unit 4 is switched off.

At step 403, the oil supply device 2 is triggered to stop supplying oil to the pressure compensation device 3 when the chamber pressure is greater than a predetermined second threshold $V_2$.

Specifically, the oil passage between the pressure compensation device 3 and power unit 4 is switched on when the oil supply device 2 stops supplying oil to the pressure compensation device 3.

The self-contained pressure compensation method of the invention can detect the chamber pressure of the pressure compensation device in real time and can realize automatic oil supply, which can provide pressure compensation for the power unit effectively and improves the working efficiency.

Further, the step 401 in which the pressure compensation device 3 detects the change in the chamber pressure of itself in real time is specifically as follows: the displacement sensor 31 in the pressure compensation device 3 detects a position S of the piston 32 in the pressure compensation device 3 relative to an upper end of the pressure compensation device 3 in real time. If the position S detected by the displacement sensor 31 is less than a first predetermined value $X_1$, the chamber pressure is determined to be less than the predetermined first threshold $V_1$; if the position S detected by the displacement sensor 31 is greater than a second predetermined value $X_2$, the chamber pressure is determined to be greater than the second threshold $V_2$.

Further, the step 402 of triggering oil supply device 2 to supply oil to the pressure compensation device 3 is specifically as follows: switching on a first main oil passage P1 to supply oil to the oil storage bladder 22 through the first main oil passage P1. Since the oil storage tank 21 is filled with oil, the oil storage bladder 22 is increased in volume when the oil from the first main oil passage P1 fills into the oil storage bladder 22, and the oil in the oil storage tank 21 is squeezed to enter the pressure compensation device 3 through the oil passage between the oil storage tank 21 and pressure compensation device 3, so as to push the piston 32 downward to achieve the oil supply to the pressure compensating device 3.

Further, the step 403 of trigging the oil supply device 2 to stop supplying oil to the pressure compensation device 3 is specifically as follows: switching off the first main oil passage P1, so that the volume of the oil storage bladder 22 is no longer increased, and the oil in the oil storage tank 21 is no longer squeezed, thereby the oil supply to the pressure compensation device 3 can be stopped.

Preferably, in the system oil refilling stage, a second main oil passage P2 and a third main oil passage P3 are switched on, so as to supply oil to the oil storage tank 21 and the pressure compensation device 3 through the third main oil passage P3, and the oil in the oil storage bladder 22 is squeezed and thus discharged through the second main oil passage P2. After the oil storage bladder 22 is evacuated and the pressure compensation device 3 and its associated power unit 4 and the spare bladder 5 are filled with oil, the second main oil passage P2 and the third main oil passage P3 are switched off.

In one embodiment, the number of pressure compensation device 3 is N, where N≥1, and when the i-th pressure compensation device **3*i* detects that the chamber pressure is less than a predetermined first threshold $V_{1i}$, the oil passage between the oil storage tank 21 and the pressure compensation device 3*i* is switched on; when the pressure compensation device 3*i* detects that the chamber pressure is greater than a predetermined second threshold $V_{2i}$, the oil passage between the oil storage tank 21 and the pressure compensation device 3*i*** is switched off, wherein $1 \le i \le N$.

Figure 5:
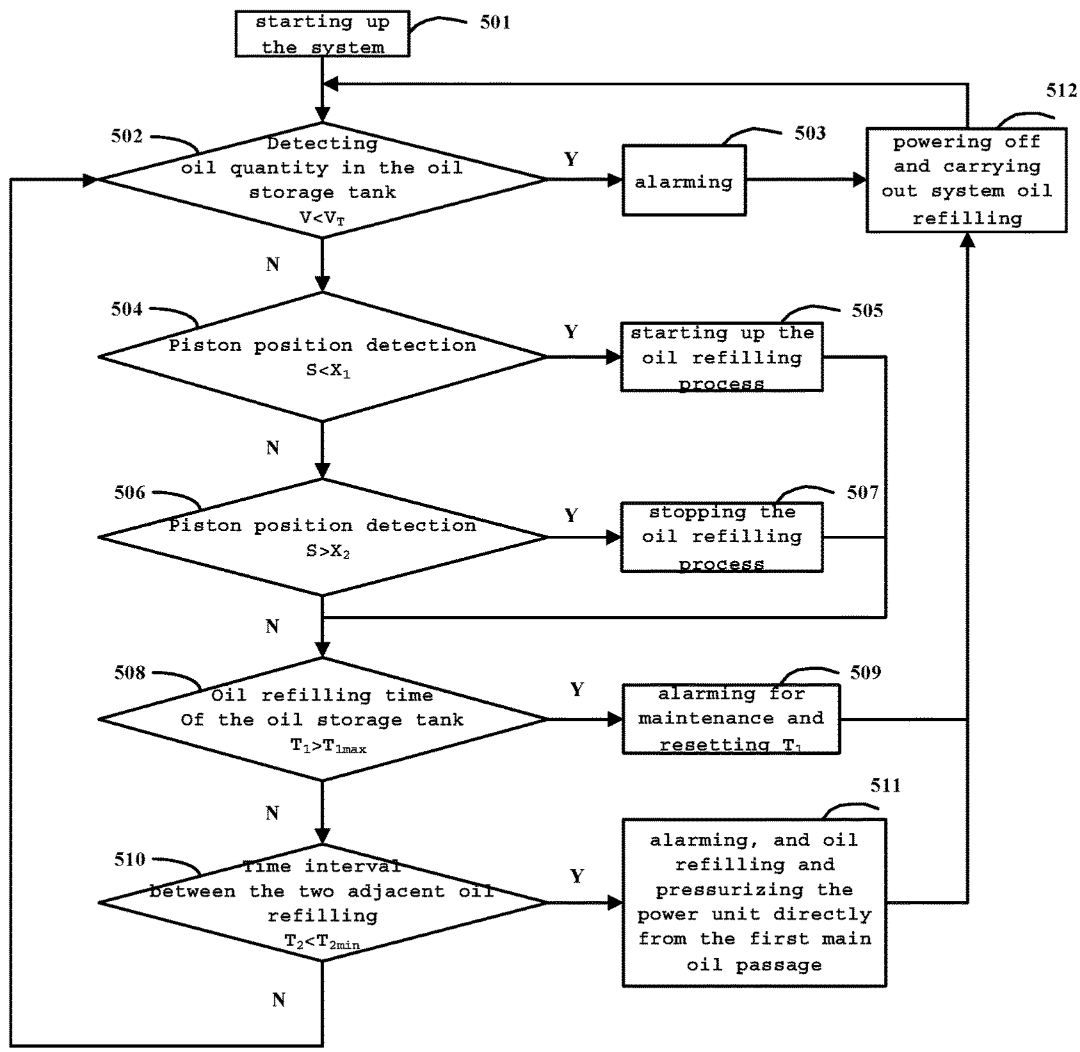
FIG. 5 is a schematic view of an embodiment of a pressure monitoring method of the self-contained pressure compensation system of the present invention.

FIG. 5 is a schematic view of an embodiment of a pressure monitoring method of the self-contained pressure compensation system of the present invention. As shown in FIG. 2 and FIG. 5, the method comprises:

A step 501 of starting up the system.

A step 502 of detecting whether the oil quantity V in the oil storage tank 21 is sufficient, and when V is smaller than the system oil refilling threshold $V_T$, proceeding to a step 503, and when $V \ge V_T$, proceeding to a step 504.

A step 503 of alarming and then proceeding to a step 512.

A step 504 of detecting whether or not the position S of the piston 32 relative to the upper end of the pressure compensation device 3 is smaller than the first predetermined value $X_1$; proceeding to a step 505 if $S<X_1$, and proceeding to a step 506 if $S \ge X_1$.

A step 505 of starting up the charge process and then proceeding to step 508.

In one embodiment, the step 505 specifically is: switching off the oil passage between the pressure compensation device 3 and the power unit 4, and switching on the first main oil passage P1 and the oil passage between the pressure compensation device 3 and the oil storage tank 21.

a step 506 of determining whether or not the position S of the piston 32 relative to the upper end of the pressure compensation device 3 is greater than the second predetermined value $X_2$, proceeding to a step 507 if $S>X_2$, and proceeding to a step 508 if $S \le X_2$.

A step 507 of ending the oil refilling process.

In one embodiment, the step 507 specifically is: switching on the oil passage between the pressure compensation device 3 and the power unit 4, and switching off the first main oil passage P1, and the oil passage between the pressure compensation device 3 and the oil storage tank 21.

The pressure monitoring method of the self-contained pressure compensation system of the present invention can detect the chamber pressure of the pressure compensation device in real time and can realize automatic oil refilling, which can provide the pressure compensation for the power unit effectively and improves the working efficiency.

A step 508 of determining whether or not the time $T_1$ for oil refilling of the oil storage tank 21 is greater than a predetermined first time $T_{1max}$, proceeding to a step 509 if $T_1>T_{1max}$ and proceeding to a step 510 if $T_1 \le T_{1max}$.

A step 509 of alarming for maintenance and resetting $T_1$, then proceeding to a step 512.

A step 510 of determining whether or not a time interval $T_2$ between two adjacent oil refilling is less than a predetermined second time $T_{2min}$, and proceeding to a step 511 if $T_2<T_{2min}$, returning to the step 502 if $T_2 \ge T_{2min}$.

A step 511 of presenting an alarm, switching on the first main oil passage P1, and switching on an oil passage between the pressure compensation device 3 and the corresponding power unit 4, oil refilling and pressurizing the power unit 4 from the first main oil passage P1.

A step 512 of powering off and carrying out system oil refilling.

In one embodiment, the pressure compensation device 3 can count the amount of oil refilling based on the displacement of the piston 32 at each time of oil refilling, and the switch control device 1 can determine whether or not the oil quantity V in the oil storage tank 21 is sufficient according to the amount of oil refilling. A method of counting the amount of oil refilling is as follows: the displacement of the piston 32 is $|X_2-X_1|$ each time the oil refilling is made, and in case where the cross-sectional area of the pressure compensation device 3 is known, the amount of oil refilling $V_o$ at each time can be obtained. By counting the number n of times of oil refilling, the amount of oil refilling $nV_o$ can be obtained, whereby the remaining oil quantity V in the oil storage tank 21 can be obtained. Another more accurate method of counting the amount of oil refilling is to obtain an accumulated displacement amount X of the piston 32 by counting the displacement of the piston 32 at each time, which is multiplied with the cross-sectional area of the pressure compensation device 3 to obtain a total amount of oil refilling, whereby the remaining oil quantity V in the oil storage tank 21 can be obtained.

Figure 6:
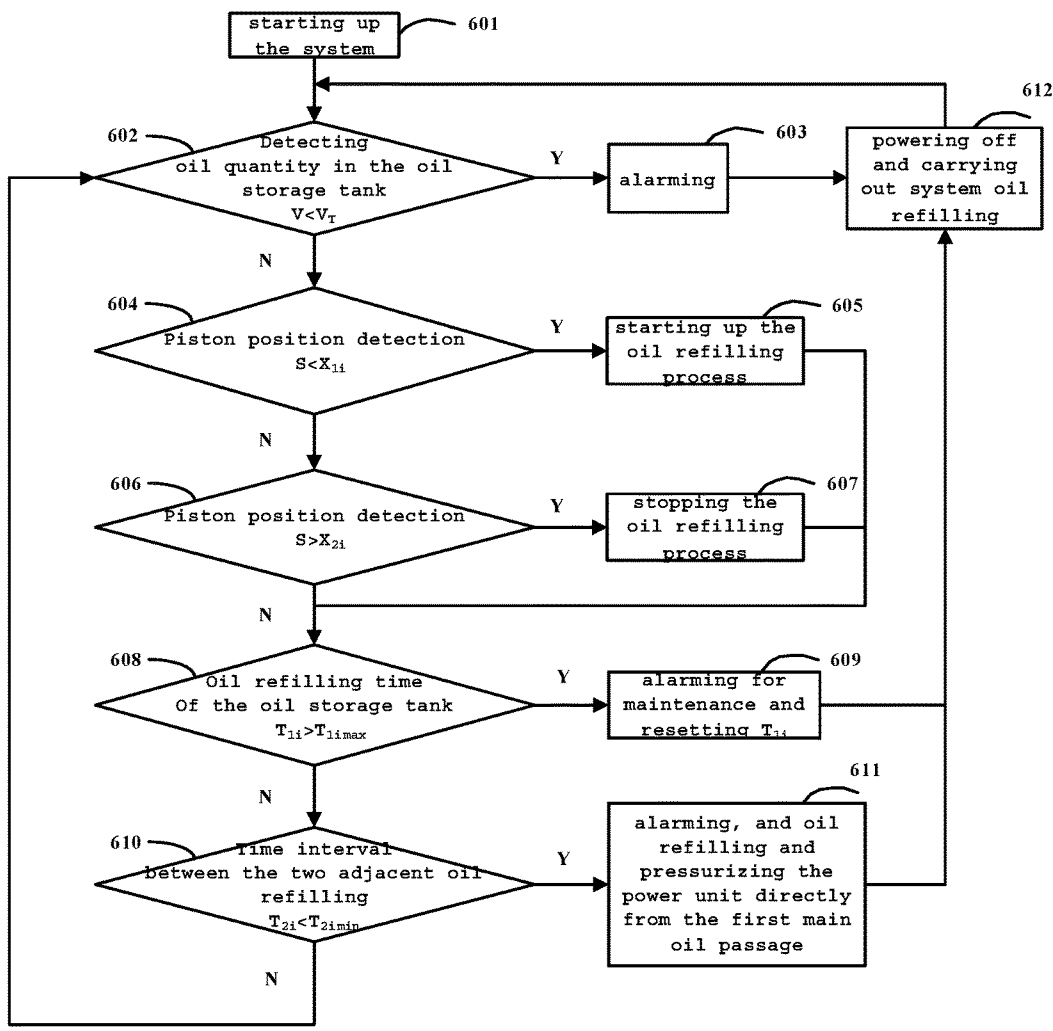
FIG. 6 is a schematic view of another embodiment of the pressure monitoring method of the self-contained pressure compensation system of the present invention.

FIG. 6 is a schematic view of another embodiment of the pressure monitoring method of the self-contained pressure compensation system of the present invention. When the self-contained pressure compensation system of the present invention compensates pressure for N (N>1) power units 4*i* (1<i≤N), as shown in FIGS. 3 and 6, the method comprises:

A step 601 of starting up the system.

A step 602 of detecting whether or not the oil quantity V in the oil storage tank 21 is sufficient, proceeding to a step 603 if V is smaller than the system oil refilling threshold $V_T$, and proceeding to a step 604 if $V \geq V_T$.

A step 603 of alarming, then proceeding to a step 612.

A step 604 of detecting whether or not the position Si of the piston 32*i* relative to the upper end of the pressure compensating device 3*i* is smaller than a first predetermined value $X_{1i}$, proceeding to a step 605 if $Si<X_{1i}$; and proceeding to a step 606 if $Si \geq X_{1i}$.

A step 605 of starting up the oil refilling process, then proceeding to a step 608.

In one embodiment, the step 605 is specifically as follows: cutting off the oil passage between the pressure compensation device 3*i* and the power unit 4*i* and switches on the first main oil passage P1 and the oil passage between the pressure compensation device 3*i* and the oil storage tank 21.

A step 606 of determining whether or not the position $S_i$ of the piston 32*i* relative to the upper end of the pressure compensation device 3*i* is greater than the second predetermined value $X_{2i}$, proceeding to a step 607 if $Si>X_{2i}$, and proceeding to a step 608 if $Si \leq X_{2i}$.

A step 607 of ending the oil refilling process.

In one embodiment, the step 607 is specifically as follows: switching on the oil passage between the pressure compensation device 3*i*, and the power unit 4*i* and switching off the first main oil passage P1 and the oil passage between the pressure compensation device 3*i* and the oil storage tank 21.

The pressure monitoring method of the self-contained pressure compensation system of the present invention can detect the chamber pressure of the pressure compensation device in real time and can realize automatic oil refilling, which can provide the pressure compensation for the power unit effectively and improves the working efficiency.

A step 608 of determining whether or not the time $T_{1i}$ during which the oil storage tank 21 is oil refilled is greater than a predetermined first time $T_{1imax}$, proceeding to a step 609 if $T_1>T_{1imax}$, and proceeding to a step 610 if $T_1 \leq T_{1imax}$.

A step 609 of alarming for maintenance and resetting $T_{1i}$, then proceeding to a step 612.

A step 610 of determining whether or not the time interval $T_{21}$ between the two adjacent oil refilling is less than a predetermined second time $T_{2imin}$, proceeding to a step 611 if $T_2<T_{2imin}$, and returning to the step 602 if $T_2 \geq T_{2imin}$.

A step 611 of presenting an alarm, switching on the first main oil passage P1, and switching on the oil passage between the pressure compensation device 3*i* and the respective power unit 4*i*, and oil refilling and pressurizing the power unit 4*i* directly from the first main oil passage P1.

A step 612 of powering off and carrying out the system oil refilling.

It is to be noted that, the required pressurizing ranges are not the same due to different pressure compensation device 3*i* and the power unit 4*i*, therefore, different $X_{1i}$, $X_{2i}$, $T_{1imax}$ and $T_{2imax}$ may be set for the different pressure compensation device 3*i* and power unit 4*i*.

In one embodiment, the pressure compensation device 3*i* can count the amount of oil refilling according to the displacement of the piston 32*i* at each time of oil refilling, whereby the switch control device 1 can determine whether or not the oil quantity V in the oil storage tank 21 is sufficient according to the amount of oil refilling. A method of counting the amount of oil refilling is as follows: the displacement of the piston 32*i* is $|X_{2i}-X_{1i}|$ at each time of oil refilling, and in case where the cross-sectional area of the pressure compensation device 3*i* is known, the amount of oil refilling $V_{oi}$ at each time can be obtained; by counting the number $n_i$ of times of oil refilling, the amount of oil refilling $n_iV_{oi}$ can be obtained; by summing the amounts of oil refilling of the respective pressure compensation device 3*i*, a total amount of oil refilling $V_o$ can be obtained, whereby the remaining oil quantity V in the oil storage tank 21 can be obtained. Another more accurate method of counting the amount of oil refilling is: obtaining an accumulated displacement amount $X_i$ of the piston 32*i* by counting the displacement of the piston 32*i* at each time, which is multiplied with the cross-sectional area of the pressure compensation device 3*i* to obtain an amount of oil refilling of each pressure compensation device 3*i*, which are summed to obtain a total amount of oil refilling $V_o$, whereby the remaining oil quantity V in the oil storage tank 21 can be obtained.

Referring to FIGS. 2 and 5, a description will be given to a specific embodiment of the self-contained pressure compensation system of the present invention comprising a pressure compensation device 3, a power unit 4 and a spare bladder 5.

The system is started up, and when the oil quantity V in the oil storage tank 21 is determined to be less than the predetermined system oil refilling threshold $V_T$, the system alarms, the system is oil refilled. In the system oil refilling stage, a first shut-off valve 9 and a second shut-off valve 10 are opened to switch on a second main oil passage P2 and a third main oil passage P3, while opening the vent holes of the oil storage tank 21 and the pressure compensation device 3, to refill oil in to the oil storage tank 21 and the pressure compensation device 3 through the main oil passage P3, and the oil in the oil storage bladder 22 is squeezed and discharged through the second main oil passage P2; after the oil storage bladder 22 is evacuated and the pressure compensation device 3 and its associated power unit 4 and the spare bladder 5 are filled with oil, the first shut-off valve 9 and the second shut-off valve 10 are switched off to cut off the second main oil passage P2 and the third main oil passage P3.

In the working stage of the compensation system, when the displacement sensor 31 detects that the displacement S of the piston 32 relative to the top of the pressure compensation device 3 is less than the first predetermined value $X_1$, the switch control device 1 is indicated that the chamber pressure is less than the predetermined first threshold $V_1$, the switch control device 1 controls the first change valve 6 to be switched on so that the oil storage bladder 22 is refilled with oil by the first main oil passage P1; the second change valve 7 is switched off, and at this time the pressure of the power unit 4 is balanced by the spare bladder 5. The oil storage bladder 22 is refilled with oil and thus inflated, and the oil in the oil storage tank 21 is squeezed to enter the pressure compensation device 3 to push the piston 32 downwards, until the position S of the piston 32 relative to the pressure compensation device 3 is greater than $X_2$, and the first change valve 6 is closed and the second change valve 7 is opened, at this time, the pressure compensation device 3 is connected to the power unit 4 and the spare bladder 5 to provide a pressure compensation that is higher than the original pressure for the power unit 4. It should be noted that, those skilled in the art could derive from the invention that, the displacement sensor 31 can be provided on the bottom of the pressure compensation device 3 to measure the displacement S of the piston 32.

The time $T_1$ for refilling oil to the pressure compensation device 3 is counted, and if the time $T_1$ is greater than the predetermined first time $T_{1max}$, it shows that oil leakage occurs in the oil supply device 2 and/or the pressure compensation device 3, the system alarms for maintenance, the previously counted T1 is reset, and the system oil refilling is made again after system maintenance.

Since a lot of oil is stored in the oil storage tank 21, oil refilling can be automatically made for the pressure compensation device 3 a plurality of times, thereby reducing the number of times of oil refilling for the system. It is determined whether the time interval $T_2$ counted between two adjacent oil refilling of oil storage tank 21 is less than the predetermined second time $T_{2min}$. If $T_2<T_{2min}$, it means that oil leakages occurs in the pressure compensation device 3 and/or the power unit 4 and/or the spare bladder 5. At this time, the system alarms, T2 is reset, and the first change valve 6 and the second change valve 7 are opened to provide temporary pressure compensation to power unit 4, thereafter, the system is powered off for maintenance, and the system oil refilling is made again after the system maintenance.

The pressure compensation device 3 can count the amount of oil refilling according to the displacement of the piston 32 at each time of oil refilling, and the switch control device 1 can determine whether or not the oil quantity V in the oil storage tank 21 is sufficient according to the amount of oil refilling. A method of counting the amount of oil refilling is as follows: the displacement of the piston 32 is $|X_2-X_1|$ at each time of oil refilling, and in case where the cross-sectional area of the pressure compensation device 3 is known, the amount of oil refilling $V_o$ at each time can be obtained; by counting the number n of times of oil refilling, the amount of oil refilling $nV_o$ can be obtained, whereby the remaining oil quantity V in the oil storage tank 21 can be obtained. Another more accurate method of counting the amount of oil refilling is: obtaining an accumulated displacement amount X of the piston 32 by counting the displacement of the piston 32 at each time, which is multiplied with the cross-sectional area of the pressure compensation device 3 to obtain a total amount of oil refilling, whereby the remaining oil quantity V in the oil storage tank 21 can be obtained.

The self-contained pressure compensation system of the present invention can automatically refill the pressure compensation device 3 several times, thereby reducing the number of times of oil refilling for the system. In addition, even if oil leakage occurs in the pressure compensation device 3 or the sealing assembly of the power unit 4 is damaged to cause oil leakage, the system is still able to maintain the internal pressure of the power unit 4 higher than the outside for a long time, to prevent mud in the outside from entering the inside of the power unit 4. Therefore, the system improves the reliability of the power unit 4 greatly.

Referring to FIGS. 3 and 6, a specific embodiment of a self-contained pressure compensation system of the present invention comprising N (N>1) pressure compensation device 3*i* ($1<i\leq N$), N power units 4*i* and N spare bladder 5*i* is described below.

The system is started up, and when the oil quantity V in the oil storage tank 21 is determined to be less than the predetermined system oil refilling threshold $V_T$, the system alarms, and oil refilling is made for the system. In the system oil refilling stage, the first shut-off valve 9 and the second shut-off valve 10 are opened to switch on the second main oil passage P2 and the third main oil passage P3, while the vent holes of the oil storage tank 21 and the pressure compensation device 3*i* are opened, to refill the oil storage tank 21 and the pressure compensation device 3*i* with oil through the third main oil passage P3, and the oil in the oil storage bladder 22 is squeezed and discharged through the second main oil passage P2; after the oil storage bladder 22 is evacuated and the pressure compensation device 3*i* and its associated power unit 4*i* and the spare bladder 5*i* are filled with oil, the first shut-off valve 9 and the second shut-off valve 10 are closed to cut off the second main oil passage P2 and the third main oil passage P3.

In the working stage of the compensation system, when the displacement sensor 31*i* detects that the displacement $S_i$ of the piston 32*i* relative to the top of the pressure compensation device 3*i* is less than the first predetermined value $X_{1i}$, the switch control device 1 is indicated that the chamber pressure is less than the predetermined first threshold $V_{1i}$. The switch control device 1 controls the first change valve 6 to be opened so that the oil storage bladder 22 is refilled with oil from the first main oil passage P1, the second change valve 7 is cut off, and at this time the pressure of the power unit 4*i* is balanced by the spare bladder 5*i*. The oil storage bladder 22 is refilled with oil and thus inflated and the oil in the oil storage tank 21 is squeezed to enter the pressure compensation device 3*i* to push the piston 32*i* downwards, until the position $S_i$ of the piston 32*i* relative to the pressure compensation device 3*i* is greater than $X_{2i}$, the first change valve 6 is closed and the second change valve 7*i* is opened, at this time the pressure compensation device 3*i* is connected to the power unit 4*i* and the spare bladder 5*i* to provide a pressure compensation that is higher than the original pressure for the power unit 4*i*. It should be noted that those skilled in the art could derive from the invention that, the displacement sensor 31*i* can be also provided on the bottom of the pressure compensation device 3*i* to measure the displacement $S_1$ of the piston 32*i*.

The time $T_{1i}$ for refilling oil to the pressure compensation device 3*i* is counted, if the time $T_{1i}$ is greater than the predetermined first time $T_{1imax}$, it means that oil leakage occurs in the oil supply device 2 and/or the pressure compensation device 3*i*, the system alarm for maintenance, the previously counted $T_{1i}$ is reset, and the system oil refilling is made again after system maintenance.

Since a lot of oil is stored in the oil storage tank 21, the pressure compensation device 3*i* can be oil refilled automatically several times, thereby reducing the number of times of oil refills for the system. It is determined whether the time interval $T_{2i}$ counted between the two adjacent oil refilling of oil storage tank 21 to the pressure compensation device 3*i* is less than the predetermined second time $T_{2imin}$. If $T_{2i}<T_{2imin}$, it means that oil leakage occurs in the pressure compensation device 3*i* and/or the power unit 4*i* and/or spare bladder 5*i*. At this time, the system alarms, $T_{2i}$ is reset, the first change valve 6 and the second change valve 7*i* are opened to provide temporary pressure compensation to power unit 4*i*; thereafter, the system is powered off for maintenance, and the system oil refilling is made again after the system maintenance.

The pressure compensation device 3*i* can count the amount of oil refilling according to the displacement of the piston 32*i* at each time of oil refilling, and the switch control device 1 can determine whether or not the oil quantity V in the oil storage tank 21 is sufficient according to the amount of oil refilling. A method of counting the amount of oil refilling is as follows: the displacement of the piston 32*i* is $|X_{2i}-X_{1i}|$ at each time of oil refilling, and in case where the cross-sectional area of the pressure compensation device 3*i* is known, the amount of oil refilling $V_{oi}$ at each time can be obtained; by counting the number $n_i$ of times of oil refills, the amount of oil refilling $n_iV_{oi}$ can be obtained; by summing the amounts of oil refilling of the respective pressure compensation device 3*i*, a total amount of oil refilling $V_o$ can be obtained, whereby the remaining oil quantity V in the oil storage tank 21 can be obtained. Another more accurate method of counting the amount of oil refilling is: obtaining an accumulated displacement amount $X_i$ of the piston 32*i* by counting the displacement of the piston 32*i* at each time, which is multiplied with the cross-sectional area of the pressure compensation device 3*i* to obtain an amount of oil refilling of each pressure compensation device 3*i*, which are summed to obtain a total amount of oil refilling $V_o$, whereby the remaining oil quantity V in the oil storage tank 21 can be obtained.

It is to be noted that, the required pressurizing ranges are not the same due to different pressure compensation device 3*i* and the power unit 4*i*, therefore, different $X_{1i}$, $X_{2i}$, $T_{1imax}$ and $T_{2imin}$ may be set for the different pressure compensation device 3*i* and power unit 4*i*.

The self-contained pressure compensation system of the present invention can refill the plurality of pressure compensation device 3*i* automatically several times, thereby reducing the number of times of oil refills for the system. In addition, even if oil leakage occurs in the pressure compensation device 3*i* or the sealing assembly of the power unit 4*i* is damaged to cause oil leakage, the system is still able to maintain the internal pressure of the power unit 4*i* higher than the outside for a long time, to prevent mud in the outside from entering the inside of the power unit 4*i*. Therefore, the system improves the reliability of the power unit 4*i* greatly.

The description of the invention is given by way of example and description, and is not intended to be exhaustive or to limit the invention to the form disclosed. Many modifications and variations will be apparent to those of ordinary skill in the art. The embodiments are chosen and described in order to better illustrate the principles and practical application of the invention and to enable one of ordinary skill in the art to understand the invention in order to design various embodiments with various modifications suitable for a particular application.

What is claimed is:

1. A self-contained pressure compensation system, comprising:

an oil supply device;

a pressure compensation device and a power unit associated with the pressure compensation device, the pressure compensation device supplying oil to the power unit and detecting a change in a chamber pressure of the pressure compensation device itself in real time; and a switch control device for triggering the oil supply device to supply oil to the pressure compensation device if a chamber pressure detected by the pressure compensation device is less than a predetermined first threshold, and triggering the oil supply device to stop supplying oil to the pressure compensation device if the chamber pressure is greater than a predetermined second threshold;

the pressure compensation device comprises:

a displacement sensor fixed to an upper end of the pressure compensation device, for detecting a position of a piston relative to the upper end of the pressure compensation device, and for indicating to the switch control device that the chamber pressure is less than the predetermined first threshold if the position detected is less than a first predetermined value, and that the chamber pressure is greater than the predetermined second threshold if the position detected is greater than a second predetermined value; and the piston capable of moving up and down in a chamber of the pressure compensation device;

the oil supply device comprises an oil storage tank, the oil storage tank being provided with an oil storage bladder, the oil storage bladder being connected to a first main oil passage;

the switch control device is configured to switch on the first main oil passage when triggering the oil supply device to supply oil to the pressure compensation device, so as to supply oil to the oil storage bladder through the first main oil passage, causing a volume increase of the oil storage bladder and thus causing the oil in the oil storage tank to be squeezed by the oil storage bladder and enter the pressure compensation device through an oil passage between the oil storage tank and the pressure compensation device, so that the piston in the pressure compensation device moves downwards; and the switch control device is configured to switch off the first main oil passage when triggering the oil supply device to stop supplying oil to the pressure compensation device, so as to stop supplying the oil to the oil storage bladder.

2. The system according to claim 1, wherein the switch control device is configured to:

switch off an oil passage between the pressure compensation device and the power unit when the oil supply device supplies oil to the pressure compensation device, and switch on the oil passage between the pressure compensation device and the power unit when the oil supply device stops supplying oil to the pressure compensation device.

3. The system according to claim 2, further comprising:

a spare bladder connected in the oil passage between the pressure compensation device and the power unit, for providing pressure compensation for the power unit when the oil passage between the pressure compensation device and the power unit is switched off.

4. The system according to claim 1, further comprising:

a first change valve provided on the first main oil passage, for controlling an on-off state of the first main oil passage; and a second change valve provided on an oil passage between the pressure compensation device and the associated power unit, for controlling an on-off state of the oil passage between the pressure compensation device and the associated power unit.

5. The system according to claim 4, further comprising:

a check valve provided on the oil passage between the oil storage tank and the pressure compensation device, for preventing the oil in the pressure compensation device from flowing back to the oil storage tank.

6. The system according to claim 1, wherein:

the oil storage bladder is also connected with a second main oil passage, and the oil storage tank and the pressure compensation device are connected with a third main oil passage respectively;

in a system oil refilling stage, the second main oil passage and the third main oil passage are configured to be switched on, so that oil is supplied to the oil storage tank and the pressure compensation device through the third main oil passage, squeezing the oil storage bladder and thus discharging the oil in the oil storage bladder through the second main oil passage;

the second main oil passage and the third main oil passage are configured to be switched off after the oil storage bladder is evacuated and the pressure compensation device and its associated power unit and a spare bladder are filled with oil.

7. The system according to claim 6, wherein:

the oil storage tank is provided with a vent hole that can be closed, so as to discharge air in the oil storage tank in the system oil refilling stage; and the pressure compensation device is provided with a vent hole that can be closed, so as to discharge air in the pressure compensation device in the system oil refilling stage.

8. The system according to claim 7, wherein the vent hole that can be closed on the oil storage tank is provided above the oil storage tank, and the vent hole that can be closed on the pressure compensation device is provided above the pressure compensation device.

9. The system according to claim 1, wherein the system includes a number N of pressure compensation devices, $N \geq 1$; and wherein the switch control device is configured to switch on an oil passage between an oil storage tank and the i-th pressure compensation device when the i-th pressure compensation device in the system detects that the chamber pressure is less than the predetermined first threshold, and switches off the oil passage between the oil storage tank and the i-th pressure compensation device when the i-th pressure compensation device detects that the chamber pressure is greater than the predetermined second threshold, where $1 \leq i \leq N$.

10. The system according to claim 9, further comprising:

a compensation change valve provided on the oil passage between the oil storage tank and each pressure compensation device respectively, for controlling an on/off state of the respective oil passages.

* * * * *